United States Patent [19]

Derouane et al.

[11] Patent Number: 4,780,444
[45] Date of Patent: Oct. 25, 1988

[54] ACTIVATION OF METALLOPHOPHATES

[75] Inventors: Eric G. Derouane; Emmerson Bowes, both of Hopewell, N.J.

[73] Assignee: Mobil Oil Corporation, New York, N.Y.

[21] Appl. No.: 606,497

[22] Filed: May 3, 1984

[51] Int. Cl.$^4$ .................. B01J 27/182; B01J 27/14
[52] U.S. Cl. ..................... 502/214; 502/208
[58] Field of Search .................. 502/208, 214

[56] References Cited

U.S. PATENT DOCUMENTS

| | | | |
|---|---|---|---|
| 3,091,544 | 5/1963 | Hund et al. | 106/288 |
| 3,213,035 | 10/1965 | Monell | 502/214 |
| 3,342,750 | 9/1967 | Kearby | 502/208 |
| 3,679,601 | 7/1972 | Nolan et al. | 502/208 |
| 3,867,279 | 2/1975 | Young | 208/114 |
| 3,962,134 | 6/1976 | Coff | 502/214 X |
| 4,038,211 | 7/1977 | Frampton | 502/214 |
| 4,080,311 | 3/1978 | Kehl | 502/208 |
| 4,222,896 | 9/1980 | Swift et al. | 252/437 |
| 4,310,440 | 1/1982 | Wilson et al. | 252/435 |
| 4,376,067 | 3/1983 | Vogel et al. | 502/208 |
| 4,385,994 | 5/1983 | Wilson et al. | 210/689 |
| 4,392,984 | 7/1983 | Engebach et al. | 502/208 |
| 4,407,730 | 10/1983 | Kehl | 502/208 |
| 4,407,732 | 10/1983 | Kehl | 502/208 |
| 4,440,871 | 4/1984 | Lok et al. | 502/214 |
| 4,468,475 | 8/1984 | Kuehl | 502/71 |
| 4,482,776 | 11/1984 | Rosenfeld et al. | 502/208 X |

FOREIGN PATENT DOCUMENTS

| | | |
|---|---|---|
| 0043562 | 1/1982 | European Pat. Off. . |
| 0095364 | 11/1983 | European Pat. Off. . |
| 53-132545 | 4/1977 | Japan .................. 502/214 |

*Primary Examiner*—H. M. S. Sneed
*Assistant Examiner*—William G. Wright
*Attorney, Agent, or Firm*—A. J. McKillop; M. G. Gilman; E. F. Kenehan, Jr.

[57] ABSTRACT

There is provided a method for activating preformed, crystalline aluminum phosphates by combining these aluminum phosphates with an activating metal oxide, such as silica, and water under conditions, such as mulling, sufficient to increase the acid catalytic activity of the material.

10 Claims, No Drawings

ACTIVATION OF METALLOPHOPHATES

CROSS-REFERENCE TO RELATED APPLICATION

This application is related to copending U.S. application Ser. No. 562,673, filed Dec. 19, 1983 now abandoned, the entire disclosure of which is expressly incorporated herein by reference.

BACKGROUND

This invention relates to a method for activating preformed, crystalline aluminum phosphates by combining these aluminum phosphates with an activating metal oxide, such as silica, and water under conditions sufficient to increase the acid catalytic activity of the material.

Aluminum phosphates are taught in U.S. Pat. Nos. 4,310,440 and 4,385,994, for example. Aluminum phosphate materials have electroneutral lattices and, therefore, are not useful as ion-exchangers or as catalyst components. Microporous aluminum phosphates have a composition typified as:

$$xR : Al_2O_3 : (1.0\pm0.2) P_2O_5 : yH_2O$$

wherein R is an organic amine or quaternary ammonium salt entrapped within the aluminum phosphate and playing a role as crystallization template, x and y representing the amounts of R and H$_2$O needed to fill the microporous voids. Because of the aluminum/phosphorus atomic ratio of these materials is about unity, they display virtually no ion-exchange properties, the framework positive charge on phosphorus being balanced by corresponding negative charge on aluminum:

$$AlPO_4 = (AlO_2^-)(PO_2^+)$$

The phosphorus-substituted zeolites of Canadian Pat. Nos. 911,416; 911,417 and 911,418 are referred to as "aluminosilicophosphate" zeolites. Some of the phosphorus therein appears to be occluded, not structural. These latter materials containing silicon, aluminum and phosphorus are characterized by the general formula:

$$M_{(x-y)}:x(AlO_2^-):(SiO_2):y(PO_2^+):zH_2O$$

wherein M is a monovalent cation, x is approximately 1-4, y is 0.05-1.0 and z is the number of hydration water molecules. Structural replacement of silicon with phosphorus has been realized in materials called silica clathrates (West German Patent No. 3,128,988).

U.S. Pat. No. 4,363,748 describes a combination of silica and aluminum-calcium-cerium phosphate as a low acid activity catalyst for oxidative dehydrogenation. Great Britain Patent No. 2,068,253 discloses a combination of silica and aluminum-calcium-tungsten phosphate as a low acid activity catalyst for oxidative dehydrogenation. U.S. Pat. No. 3,801,704 teaches an aluminum phosphate treated in a certain way to impart acidity. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by premolded silicates or aluminosilicates.

Other teachings of aluminum phosphates and their preparation include U.S. Pat. Nos. 4,365,095; 4,361,705; 4,222,896; 4,210,560; 4,179,358; 4,158,621; 4,071,471; 4,014,945; 3,904,550 and 3,697,550. Since their neutral framework structure is void of ion-exchange properties, they are used as catalyst supports or matrices.

The crystalline silicophosphoaluminates synthesized in accordance with the aforementioned U.S. application Ser. No. 562,673 are molecular sieve or other framework structures exhibiting ion-exchange properties and are easily and conveniently converted to materials having intrinsic catalytic activity. Techniques for synthesis of zeolites or aluminum phosphates taught in the art are not useful for synthesis of these crystalline silicophosphoaluminates.

SUMMARY

According to one aspect of the invention, there is provided a method for activating a crystalline aluminum phosphate catalyst, said method comprising combining:

(i) a solid crystalline aluminum phosphate material;
(ii) an activating metal oxide; and
(iii) water under conditions sufficient to increase the acid catalytic activity of the thusly activated catalyst with respect to the acid catalytic activity of said aluminum phosphate material (i).

According to another aspect of the invention, there is provided a method for preparing an activated, silica bound, aluminum phosphate containing catalyst said method comprising mulling silica and solid, crystalline aluminum phosphate in the presence of water under conditions sufficient to increase the acid catalytic activity of the thusly activated catalyst with respect to the acid catalytic activity of said aluminum phosphate material.

EMBODIMENTS

Examples of crystalline aluminum phosphate compositions which may be activated in accordance with the present invention are described in the aforementioned U.S. Pat. No. 4,310,440, the entire disclosure of which is expressly incorporated herein by reference. These compositions may have a framework structure with a chemical formula, expressed in terms of molar ratios of oxides, as follows:

$$Al_2O_3 : 1.0\pm0.2 \; P_2O_5.$$

The lattice structure of the crystalline material may be associated with a characteristic x-ray powder diffraction pattern.

The solid, crystalline aluminum phosphate is activated with an activating metal oxide. Such activating metal oxides are materials which are capable of being incorporated into crystalline lattice structures containing aluminum oxides and phosphorus oxides in the form of electronically neutral tetrahedra of the formula MO$_4$, where M is, e.g., Ge, Si or other functionally equivalent metals. Silica is a preferred activating metal oxide. By way of contrast, aluminum atoms in such a lattice would be associated with negatively charged tetrahedra of the formula AlO$_4^-$, and phosphorous atoms in such a lattice would be associated with positively charged tetrahedra of the formula PO$_4^+$. Expressed in other terms, the activating metal oxide would be capable of coexisting in the plus four valence state in a crystalline lattice structure also having aluminum oxide and phosphorus oxide.

The oxide will preferably act as a binder material for the activated catalyst. Accordingly, preferred activated metal oxides may be supplied in the form of silica containing binder materials. Such silica containing binder materials include silica alone, silica-alumina, silica-zirconia, silica-thoria, silica-berylia, silica-titania as well as ternary compositions, such as silica-alumina-thoria, silica-alumina-zirconia, silica-alumina-magnesia or silica-magnesia-zirconia. Simple experiment may be employed to determine other useful materials.

The amount of activating metal oxide which may be used in accordance with the present invention should be sufficient to activate the catalyst. Especially when this activating metal oxide is also used as a binder, the amount of this metal oxide may be, e.g., from 10 to 90 percent by weight, preferably 20 to 80 percent by weight, of the combined aluminum phosphate and activating metal oxide.

Without wishing to be bound by any theory or mode of action, it is theorized that activation of the crystalline aluminum phosphate may take place by incorporation of activating metal oxide (i.e. $MO_2$) directly into the aluminum phosphate lattice structure. When M is Si, the resulting lattice structure would be analogous to the silicophoshoaluinate lattice structures described in the aforementioned U.S. application Ser. No. 562,673. As pointed out in this application, silicophosphoaluminates are more catalytically active than aluminum phosphate crystalline materials which are substantially free of silica in the framework structure thereof.

It is further theorized that incorporation of the activating metal oxide into the lattice structure of the aluminum phosphate lattice may be enhanced by a solid state interaction of the aluminum phosphate and activating metal oxide in the presence of shearing forces sufficient to cleave lattice layers of aluminum phosphate crystals. Such shearing forces could expose the internal sites within the crystalline framework to which tetrahedra of the formula $MO_4$ could become affixed. Aluminum, phosphorus and/or activating metal oxides could then reform crystalline lattice portions about these sites.

Although the foregoing discussion has been put forth in terms of a non-limiting theory, it will be understood that this theory is consistent with the increased activity of the catalysts prepared in accordance with the present invention. Accordingly, this theory may be used for guidance in selecting particular embodiments within the scope of the present invention.

The crystalline aluminum phosphate can be used in an as-synthesized form, wherein organic compounds are contained in the microporous voids, or it can be used in a calcined form, wherein organic compounds have been removed.

The crystalline aluminum phosphate may be composited with a binder containing an activating metal oxide by intimately grinding the two materials together, in the presence of water, after which the mixture is formed into suitable particles and dried. When the aluminum phosphate is contacted with water, it is preferably also contacted with a basic material such as sodium hydroxide. Sufficient quantities of such basic materials may improve the extrudability of the composite enabling the formation of stronger extrudates (e.g., in terms of improved crush strength). It is also theorized that sufficient quantities of such basic materials may attack the aluminum phosphate lattice structure, weakening or partially breaking this lattice, thereby aiding in the incorporation of binder material in the lattice structure.

Examples of basic materials for carrying out the preferred extrusion process with a binder include hydroxides of Group I metals of the Periodic Table as well as alkali metal carbonates, silicates, etc. Ammonium hydroxide is not effective but more basic quaternary ammonium hydroxides can be used although they are not preferred because of a tendency to produce thixotropic masses which are difficult to extrude. In general, suitable agents are those materials which have a pH greater than 11 at 0.1 normal concentration. The most preferred material is sodium hydroxide.

The amount of water included with the binder aluminum phosphate and other optional materials may be, e.g., from about 25 to about 75 weight percent of the total mixture. The amount of optional basic material may be, e.g., from about 0.5 to about 5.0 weight percent on a dry basis based on total dry solids.

The desired enhancement of activity has not been observed if the aluminum phosphate and binder are simply mixed together instead of being intimately ground as described above. The finely ground mixture of aluminum phosphate containing crystals, binder, water and optional basic material may conveniently be formed into particles by extrusion using an extrusion press or, alternatively, other shaping methods may be used such as pelletizing or pressing. The amount of water is chosen as to give a mixture which has a satisfactory consistency for the forming step. The aluminum phosphate may contain sufficient occluded water or sufficient water may be present in the binder.

After the aluminum phosphate/binder composite has been formed it may be subjected to steaming. During this step, the composite may be held in an atmosphere entirely or partly of steam at an elevated temperature. Generally, it is preferred to operate with an atmosphere of 100% steam although partial steam atmospheres may also be used. If a gas other than steam is present it should be an inert gas such as nitrogen. The steaming is generally carried out by heating the intimate composite mixture in the presence of water at a temperature up of 500° C., preferably from 300° to 450° C The pressure during steaming may be subatmospheric, atmospheric or superatmospheric pressure, generally in the range of 0.02 to 50 atm, preferably from 0.5 to 8 atm. The steaming should generally be continued for at least one hour and usually durations of 12 to 48 hours will be preferred.

The steam may be produced in-situ, for example, by the dehydration of alcohols such as methanol, ethanol, propanol, n-butanol or pentanol to produce the steam, with olefins as a by-product or by the combustion of hydrocarbons to produce carbon oxides and steam.

The steaming may be carried out under conditions such as those described in U.S. patent application Ser. No. 121,339, filed Feb. 14, 1980 (corresponding to European Application No. 34,444), to which reference is made for details of those conditions.

The acid catalytic activity of the catalyst may be measured in terms of its alpha value. The alpha value reflects the relative activity of the catalyst with respect to a high activity silica-alumina cracking catalyst. To determine the alpha value, n-hexane conversion is determined at a suitable temperature between about 550° F. to 1000° F. (228° to 538° C.), preferably at 1000° F.

(538° C.). Conversion is varied by variation in space velocity such that a conversion level of up to about 60 percent of n-hexane is obtained and converted to a rate constant per unit volume of zeolite and compared with that of silica-alumina catalyst which is normalized to a reference activity at 1000° F. (538° C.). The catalytic activity of the catalyst is then expressed as multiple of this standard, i.e. the silica-alumina standard. The silica-alumina reference catalyst contains about 10 weight percent $Al_2O_3$ and the remainder $SiO_2$. This method of determining alpha, modified as described above, is described in the Journal of Catalysis, Vol. VI, pages 278-287, 1966, to which reference is made for further details of the method.

The extent of the activation produced by the present method is notable. Increases of over 100 percent in the alpha value may be obtained.

The crystalline materials of the present invention are readily convertible to catalytically active material for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 $hr^{-1}$ to about 20 $hr^{-1}$; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. bezene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In general, therefore, catalytic conversion conditions over an activated catalyst in accordance with the present invention include a temperature of from about 100° C. to about 760° C., a pressure of from about 0.1 atmosphere (bar) to about 200 atmospheres (bar), a weight hourly space velocity of from about 0.8 $hr^{-1}$ to about 2000 $hr^{-1}$ and a hydrogen/organic, e.g. hydrocarbon, compound of from 0 to about 100.

The activated aluminum phosphate catalysts described herein are felt to be particularly useful for the cracking of gas oils having a boiling point range falling with the range of from about 450° F. to about 1000° F. (e.g., light, medium and heavy gas oils).

EXAMPLE 1

A material possessing the $ALPO_4$-5 structure and an alpha-activity of 0.1 to 0.3 was dry-mixed with amorphous silica such as Hi-Sil 233 to which was added a solution of caustic soda containing 3% NaOH based on total dry solids. The material was mulled for 15 minutes and extruded through a 1/16" die. The ratio of silica to $ALPO_4$-5 was 1.5 : 1. The extrudate was dried at 100°-110° C., neutralized with nitric acid, washed, redried, and calcined at 530° C The material was then exchanged with 1M ammonium nitrate (3 times, 1h, room temperature ) and calcined again in air at 530° C. (3 h). The final alpha-value calculated on the $ALPO_4$-5 content was 0.9.

EXAMPLE 2

The silica bound catalyst prepared in accordance with Example 1 was used to crack an Arab Medium gas oil. The reaction conditions and results are summarized in Table 1.

TABLE 1

Catalyst: 40% aluminum phosphate ($ALPO_4$-5)
60% silica (Hi-Sil 233)
(1/16" extrudate, ground and sieved to FCC size)
Feed: 650° F. + Joliet Sour Heavy Gas Oil
Temperature = 950° F.
Pressure = 1 atm
Cat/oil (g/g) = 1.5, WHSV = 3.9

| Catalyst | 650° F.+ Conversion % | $C_1$-$C_4$ | Wt. % Selectivities | | |
|---|---|---|---|---|---|
| | | | Gasoline | Distillate | Coke |
| Example 1 | 25.5 | 4 | 30 | 63 | 3 |

The selectivities observed are desirable in terms of low yields of $C_1$-$C_4$ products, low yields of coke and high yields of distillate. In this regard, the light hydrocarbon gases are much less valued products than either gasoline or distillate products. The distillate range materials are the highest value materials in the FCC product slate. Furthermore, the demand for gasoline is decreasing slightly, whereas that for distillates such as jet fuel and diesels is increasing. Thus, the refineries in future will have to produce more distillate fuels and less gasoline.

What is claimed is:

1. A method for activating a crystalline aluminum phosphate catalyst, said method comprising combining:
   (i) a solid, microporous, crystalline aluminum phosphate material;
   (ii) an amorphous, activating metal oxide; and
   (iii) water wherein said aluminum phosphate material and said activating metal oxide are intimately ground in the presence of said water, thereby increasing the acid catalytic activity of the thusly activated catalyst with respect to the acid catalytic activity of said aluminum phosphate material, and wherein said activating metal oxide is selected from the group consisting of $SiO_2$ and $GeO_2$.

2. A method according to claim 1, wherein said activating metal oxide is silica.

3. A method according to claim 2, wherein said components (i), (ii) and (iii) are further combined with (iv) a basic material.

4. A method according to claim 1, wherein the activated catalyst is formed into a composite, said metallic oxide functioning as a binder.

5. A method according to claim 1 which further comprises the step of contacting the activated catalyst with steam under conditions sufficient to further increase the acid catalytic activity of the catalyst.

6. A method according to claim 1, wherein said aluminum phosphate is $AlPO_4$-5.

7. A method for preparing an activated, silica bound, aluminum phosphate containing catalyst, said method comprising mulling amorphous silica and solid, microporous, crystalline aluminum phosphate in the presence of water, wherein said silica and said aluminum phosphate are intimately ground, thereby increasing the acid catalytic activity of the thusly activated catalyst with respect to the acid catalytic activity of said aluminum phosphate material.

8. A method according to claim 7, wherein said silica, aluminum phosphate and water mixture which is mulled further comprises a basic material.

9. A method according to claim 8, wherein the alpha value of the activated aluminum phosphate material is at least 100 percent greater than the alpha value of the aluminum phosphate material prior to said mulling step.

10. A method according to claim 7, wherein said aluminum phosphate is $AlPO_4$-5.

* * * * *